United States Patent
Inoue et al.

(10) Patent No.: US 6,840,340 B2
(45) Date of Patent: Jan. 11, 2005

(54) ELECTRIC-POWERED VEHICLE

(75) Inventors: Takahito Inoue, Kobe (JP); Yoshinori Takezawa, Kobe (JP)

(73) Assignee: Nabco, Ltd., Kobe (JP)

(*) Notice: Subject to any disclaimer, the term of this patent is extended or adjusted under 35 U.S.C. 154(b) by 0 days.

(21) Appl. No.: 10/405,614

(22) Filed: Apr. 3, 2003

(65) Prior Publication Data

US 2003/0192724 A1 Oct. 16, 2003

(30) Foreign Application Priority Data

Apr. 10, 2002 (JP) ........................................ 2002-108155

(51) Int. Cl.⁷ ............................................. B62D 51/04
(52) U.S. Cl. ...................... 180/19.3; 180/6.5; 180/65.1; 180/907
(58) Field of Search ................................ 180/19.3, 6.5, 180/65.1, 907, 19.2, 11, 13, 65.8, 6.48, 65.5, 65.6, 65.7, 271; 280/304.1, 304.2, 250.1; 188/161, 162, 158, 173; 701/70, 79

(56) References Cited

U.S. PATENT DOCUMENTS

| | | | | |
|---|---|---|---|---|
| 4,387,325 A | * | 6/1983 | Klimo ......................... | 180/907 |
| 4,415,049 A | * | 11/1983 | Wereb ......................... | 180/6.5 |
| 5,125,468 A | * | 6/1992 | Coker .......................... | 180/907 |
| 5,139,121 A | * | 8/1992 | Kumura et al. ............. | 180/65.1 |
| 5,161,634 A | * | 11/1992 | Ichihara et al. ............. | 180/65.1 |
| 5,257,673 A | * | 11/1993 | Sato et al. ................... | 180/907 |
| 5,497,056 A | * | 3/1996 | Kurland et al. ............. | 180/907 |
| 5,927,414 A | * | 7/1999 | Kan et al. .................... | 180/907 |
| 6,158,822 A | * | 12/2000 | Shirai et al. ................. | 188/158 |
| 6,230,831 B1 | * | 5/2001 | Ogata et al. ................ | 180/65.1 |
| 6,279,934 B1 | * | 8/2001 | Womack .................... | 280/250.1 |
| 6,302,226 B1 | * | 10/2001 | Kanno et al. ................ | 180/6.5 |
| 6,385,522 B1 | * | 5/2002 | Pugh ........................... | 701/70 |
| 6,471,231 B1 | * | 10/2002 | Hargroder ................ | 280/304.1 |
| 6,494,278 B1 | * | 12/2002 | Weisz ......................... | 180/65.5 |
| 6,560,515 B2 | * | 5/2003 | Inoue ......................... | 180/907 |

FOREIGN PATENT DOCUMENTS

| | | |
|---|---|---|
| DE | 195 27 680 | 3/1997 |
| EP | 0 756 856 | 2/1997 |
| JP | 3-31063 | 2/1991 |
| JP | 10-99378 | 4/1998 |
| JP | 10-201792 | 8/1998 |
| JP | 10-336803 | 12/1998 |
| JP | 11-262111 | 9/1999 |
| JP | 11-263227 | 9/1999 |
| JP | 2000-42045 | 2/2000 |
| JP | 2000-152425 | 5/2000 |

* cited by examiner

Primary Examiner—Hau Phan
(74) Attorney, Agent, or Firm—Oblon, Spivak, McClelland, Maier & Neustadt, P.C.

(57) ABSTRACT

An electric-powered vehicle includes electric-powered drivers for driving wheels, a controller for controlling the electric-powered drivers to generate an assisting driving force in accordance with a vehicle operating force by an operator, and a brake-operation unit for applying braking forces on the wheels. The vehicle also includes a brake-operation detector for detecting a brake operation performed by the brake-operation unit. When the brake-operation detector detects the brake operation, the controller controls the drivers to reduce the assisting driving force. This structure solves a problem caused by simultaneous generation of the braking forces and the assisting driving force.

5 Claims, 8 Drawing Sheets

ELECTRIC-POWERED VEHICLE

BACKGROUND OF THE INVENTION

1. Field of the Invention

The present invention relates to an electric-powered vehicle such as an electric-powered wheelchair.

2. Description of the Related Art

Electric-powered wheelchairs of the related art include a type of wheelchair in which a motor generates an assisting driving force in accordance with an operating force generated when a caregiver pushes or pulls the wheelchair body while holding operation handles. The operating force generated by pushing or pulling the wheelchair body is detected by using a sensor to detect a force applied on the operation handles.

The wheelchair in which the assisting driving force is generated can be moved by the resultant of the operating force generated when the caregiver pushes or pulls the wheelchair body and the assisting driving force. This can reduce the load on the caregiver.

In the vicinity of the operation handles, brake levers are provided. The brake levers are connected to wheel brake mechanisms by control wires. By manually operating the brake levers, wheels can be mechanically braked.

In the electric-powered wheelchair of the related art, the braking force by the brake operation and the assisting driving force may be simultaneously generated.

By way of example, when the caregiver as an operator pushes the electric-powered wheelchair on an upslope, an assisting driving force is generated in accordance with the pushing operating force. The operator may apply the brake if needed while the wheelchair is moving on the upslope. In this case, the assisting driving force by a motor and the braking force by the brake lever are simultaneously generated.

In this case, the assisting driving force is generated against the braking force. This causes an unnecessary current to flow in the motor in the wheelchair, so that efficiency deteriorates.

For the amount of the assisting driving force generated in the wheelchair, the operator must generate a greater braking force, thus increasing the load of the brake operation.

When the operator deactivates the brake operation while the wheelchair is being brought to standstill by the brake, an assisting driving force which is being generated at the time may suddenly move the wheelchair. This causes instability of operation.

SUMMARY OF THE INVENTION

It is an object of the present invention to eliminate the above problems by providing a vehicle in which a driving force for driving the vehicle is reduced when a braking force is generated.

The present invention provides an electric-powered vehicle supplied with a propulsive force based on a vehicle operating force applied by an operator of said electric-powered vehicle and an assisting driving force. The electric-powered vehicle includes wheels, at least one operation-force detector for detecting the vehicle operating force applied by the operator, at least one electric-powered driver for driving the wheels, at least one brake-operation unit for applying braking forces on the wheels, and at least one brake-operation detector for detecting the brake operation performed by the brake-operation unit, and a controller for controlling the electric-powered driver. The controller controls the electric-powered driver to generate the assisting driving force in accordance with the vehicle operating force detected by the operation-force detector, and controls the electric-powered driver to reduce the generated assisting driving force when the brake operation is detected by the brake-operation detector.

According to the electric-powered vehicle, in its structure in which the electric-powered driver can generate the assisting driving force in accordance with the vehicle operating force of the operator, when the brake-operation detector detects the brake operation performed by the brake-operation unit, the controller reduces the assisting driving force. Therefore, an unnecessary assisting driving force that is generated when the brake operation is performed is reduced. Since the assisting driving force on the vehicle is reduced, a small braking force is only needed. This facilitates the brake operation. In addition, the reduction in the assisting driving force also reduces sudden acceleration of the vehicle which occurs when the brake operation is deactivated.

Preferably, the assisting driving force obtained when the brake operation is performed is reduced to zero. In this case, the reduction of the assisting driving force to zero eliminates a problem caused by simultaneous generation of the assisting driving force and the braking force can be solved.

According to a procedure for reducing the assisting driving force, as soon as the brake operation is detected, the assisting driving force can be reduced to zero or a predetermined value. Alternatively, it is preferable that, when the brake operation is detected, the assisting driving force be gradually reduced, because the operability improves. In other words, when the assisting driving force is immediately reduced to zero by performing the brake operation when the vehicle is on an upslope, the weight of the vehicle acts on the operator at a time, thus causing a load on the operator. However, by gradually reducing the assisting driving force, such a situation can be prevented from occurring.

It is preferable that the brake-operation detector be provided on the brake-operation unit. By providing the brake-operation detector on the brake-operation unit, it is ensured that the brake operation can be detected.

In addition, it is preferable that the brake-operation unit include a brake-operation-unit body and a movable portion provided on the brake-operation-unit body so as to be moved, and it is preferable that the brake-operation detector be provided on the brake-operation-unit body, and detects a movement of the movable portion. This case improves handling of the brake-operation detector in the case of assembling the vehicle since the brake-operation detector is provided on the brake-operation-unit body.

DESCRIPTION OF THE PREFERRED EMBODIMENTS

A preferred embodiment of the present invention is described below with reference to the accompanying drawings.

Figure 1:
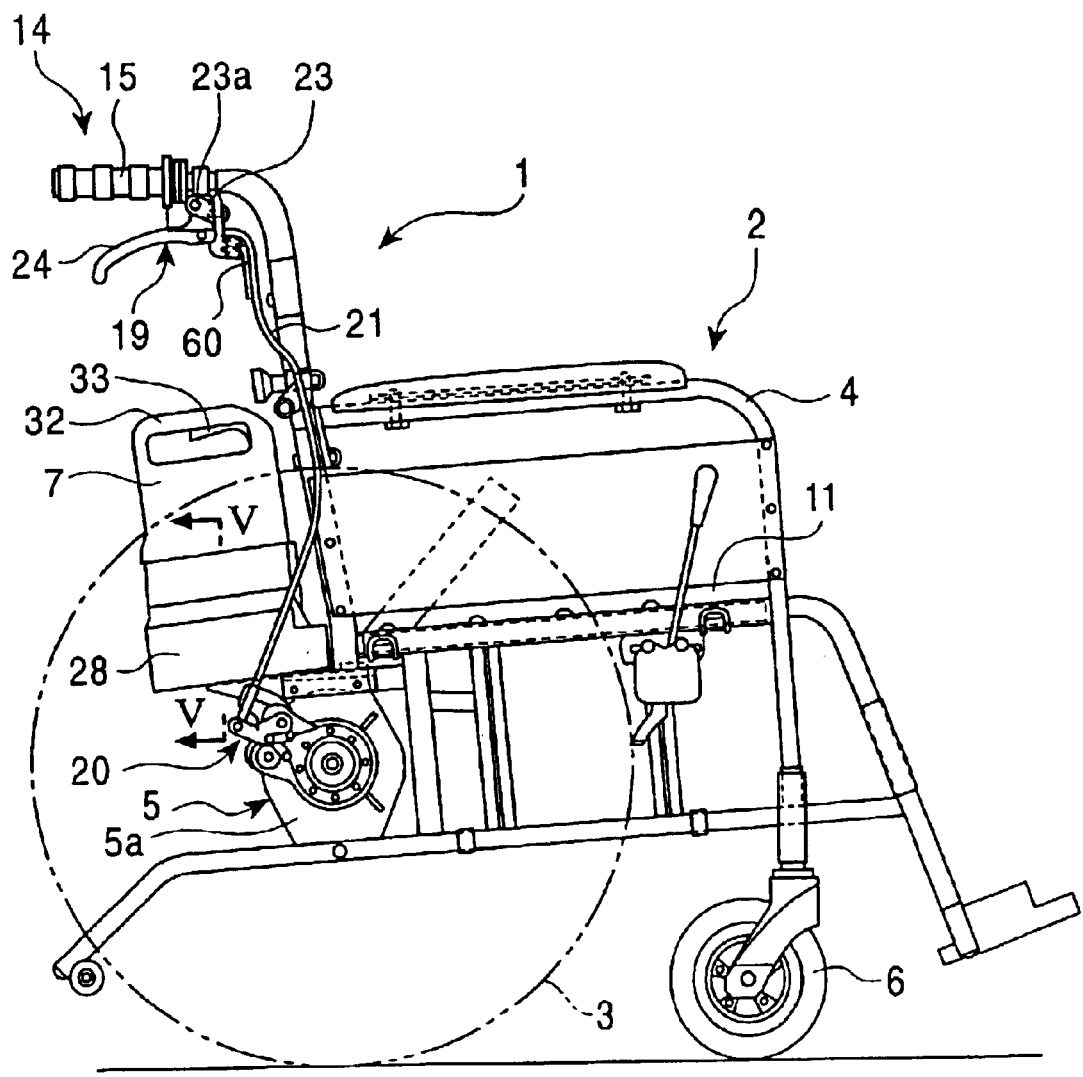
FIG. 1 is a side view of an electric-powered wheelchair.
Figure 2:
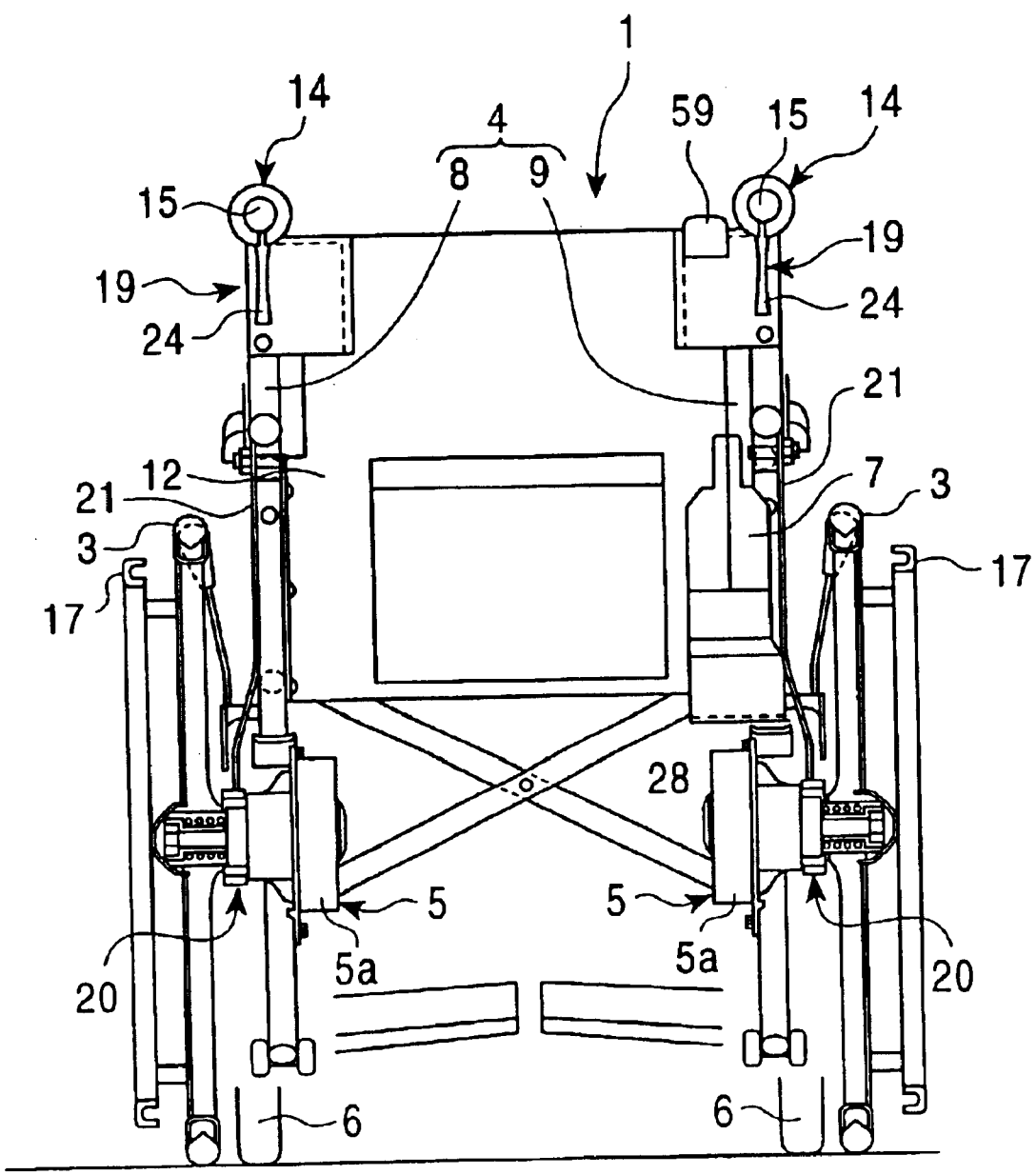
FIG. 2 is a back view of the electric-powered wheelchair shown in FIG. 1.

FIGS. 1 and 2 are a side view and back view of an electric-powered wheelchair 1 as an example of an electric-powered vehicle. The electric-powered wheelchair 1 has a wheelchair body 2 and right and left wheels (driving wheels) 3 provided on the right and left sides of the wheelchair body 2. The wheelchair body 2 includes wheelchair frames 4 and a pair of right and left electric-powered drivers 5 which each include a motor and a speed-reducing mechanism in a housing 5a.

The right and left wheels 3 as the driving wheels are attached to the electric-powered drivers 5. The wheels 3 are rotated by driving forces generated by the electric-powered drivers 5, and the driving forces are used as part of propulsion for the electric-powered wheelchair 1. Each driving force is called the "assisting driving force". The wheelchair body 2 has, in its front part, a pair of right and left casters 6. The wheelchair body 2 has a power-supply battery 7 disposed therein.

The wheelchair frames 4 consist of a left frame 8 and a right frame 9. Each of the wheelchair frames 4 is constituted by connecting a plurality of pipe members, etc. Between the right frame 9 and the left frame 8, a seat 11 and a back 12 are tightly stretched.

The wheelchair body 2 (wheelchair frames 4) has vehicle operation portions 14 at the top rear thereof. The vehicle operation portions 14 are manually held by the operator such as a caregiver when he or she pushes or pulls the electric-powered wheelchair 1. The vehicle operation portions 14 include operation grips 15. The operation grips 15 are almost horizontally provided from the tops to rear portions of the right and left frames 9 and 8. A vehicle operating force is used as part of a propulsive force of the electric-powered wheelchair 1.

The vehicle operation portions 14 each have, for example, a potentiometer as an operation-force detector. The potentiometer is provided in each vehicle operation portion 14. The potentiometer can detect a vehicle operating force of the operator which pushes or pulls the electric-powered wheelchair 1. A signal representing the detected vehicle operating force is supplied to a controller (described later). Instead of the potentiometer, a bridge circuit including a strain gauge may be used.

In a type of electric-powered wheelchair that can perform electric-powered assisting without any caregiver, the operation-force detector can be provided in a push rim 17 of each wheel 3. By providing the push rim 17 with the operation-force detector, a vehicle-operating force applied on the push rim 17 by a passenger as an operator can be detected.

Figure 3:
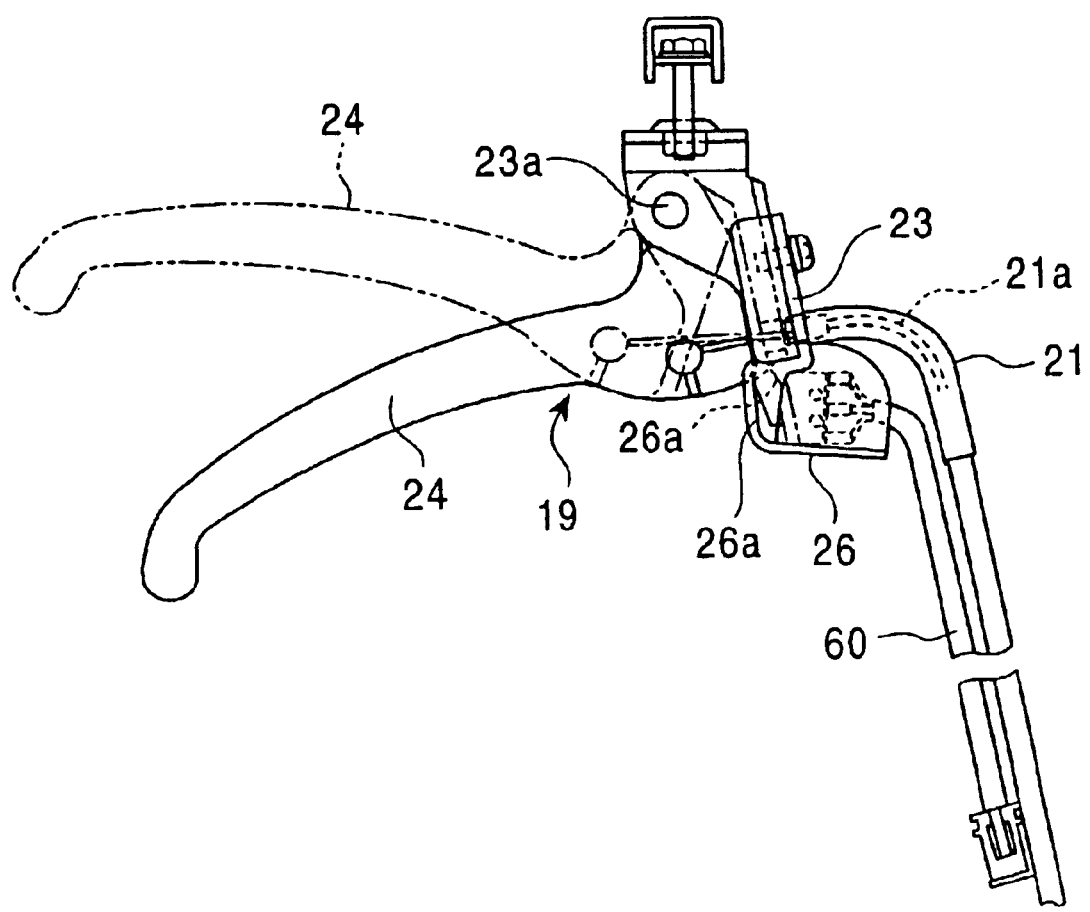
FIG. 3 is an enlarged side view of a vehicle operation portion.

As FIG. 3 shows, in the vicinity of each vehicle operation portion 14, a brake-operation unit 19 is provided. The brake-operation unit 19 is used to apply a braking force on each wheel 3 when being operated by the operator. The brake-operation unit 19 is connected by a control wire 21 to a brake mechanism 20 that mechanically brakes the rotation of the wheel 3. The brake-operation unit 19 includes a movable portion 24 so that it can be moved with respect to a brake-operating-portion body 23 provided in the vicinity of the operation grip 15. Specifically, the movable portion 24 is a brake lever supported so as to swingably pivot around a horizontal axis 23a with respect to the brake-operating-portion body 23. The brake lever is disposed below each of the right and left operation grips 15.

When the operator performs, by holding the brake lever 24 as well as the operation grip 15, a brake operation so that the brake lever 24 is close to the operation grip 15, as indicated by the chain double-dashed line shown in FIG. 3, the control wire 21 (its inner wire 21a) is pulled to operate the brake mechanism 20 to which the control wire 21 is connected, whereby each wheel 3 is braked.

A state in which the above brake operation is performed or not performed is detected by a brake-operation detector 26 provided on the brake-operating-portion body 23 in the brake-operation unit 19. The brake-operation detector 26 is provided in a lower portion of the brake-operating-portion body 23, and is formed by a limit switch whose ON/OFF state can be changed over in accordance with the movable operating portion (brake lever) 24. Specifically, the limit switch 26 is set so that, when the brake-operation unit 19 is not operated, a movable member 26a of the limit switch 26 touches the brake lever 24, and when the brake-operation unit 19 is operated, that is, when the brake lever 24 is in the position indicated by the chain double-dashed line in FIG. 3, the movable member 26a of the limit switch 26 does not touch the brake lever 24. Implementation of the brake operation allows the limit switch 26 to output a brake-operation signal, and the brake-operation signal is supplied to the controller (described later).

The battery 7 is set in a battery container (battery case) 28. The battery container 28 is provided on the right side of the rear portion of the wheelchair body 2. The position of the battery container 28 is not limited. In other words, the battery 7 as a power supply can be disposed in an arbitrary position of the wheelchair body 2.

Figure 4:
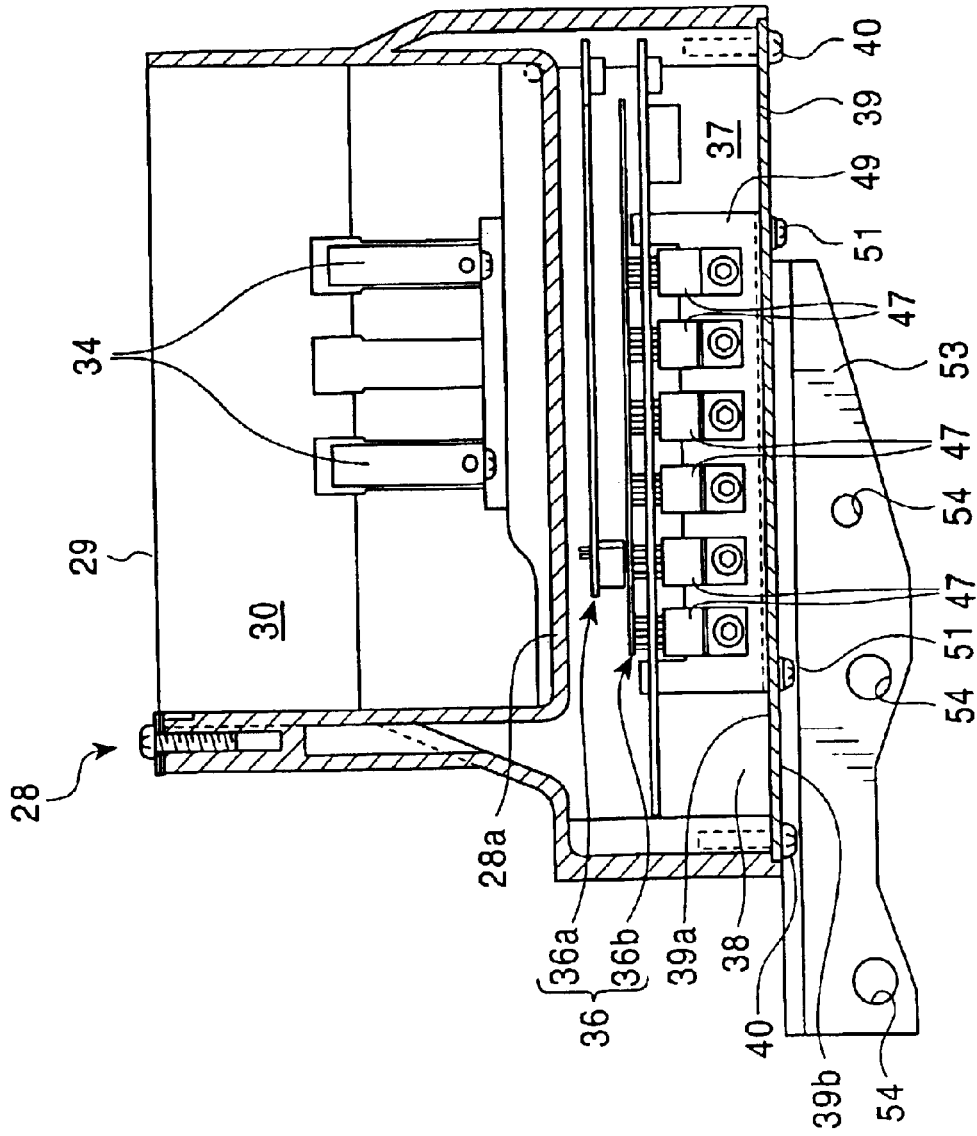
FIG. 4 is a section view taken on the line IV—IV shown in FIG. 6.
Figure 5:
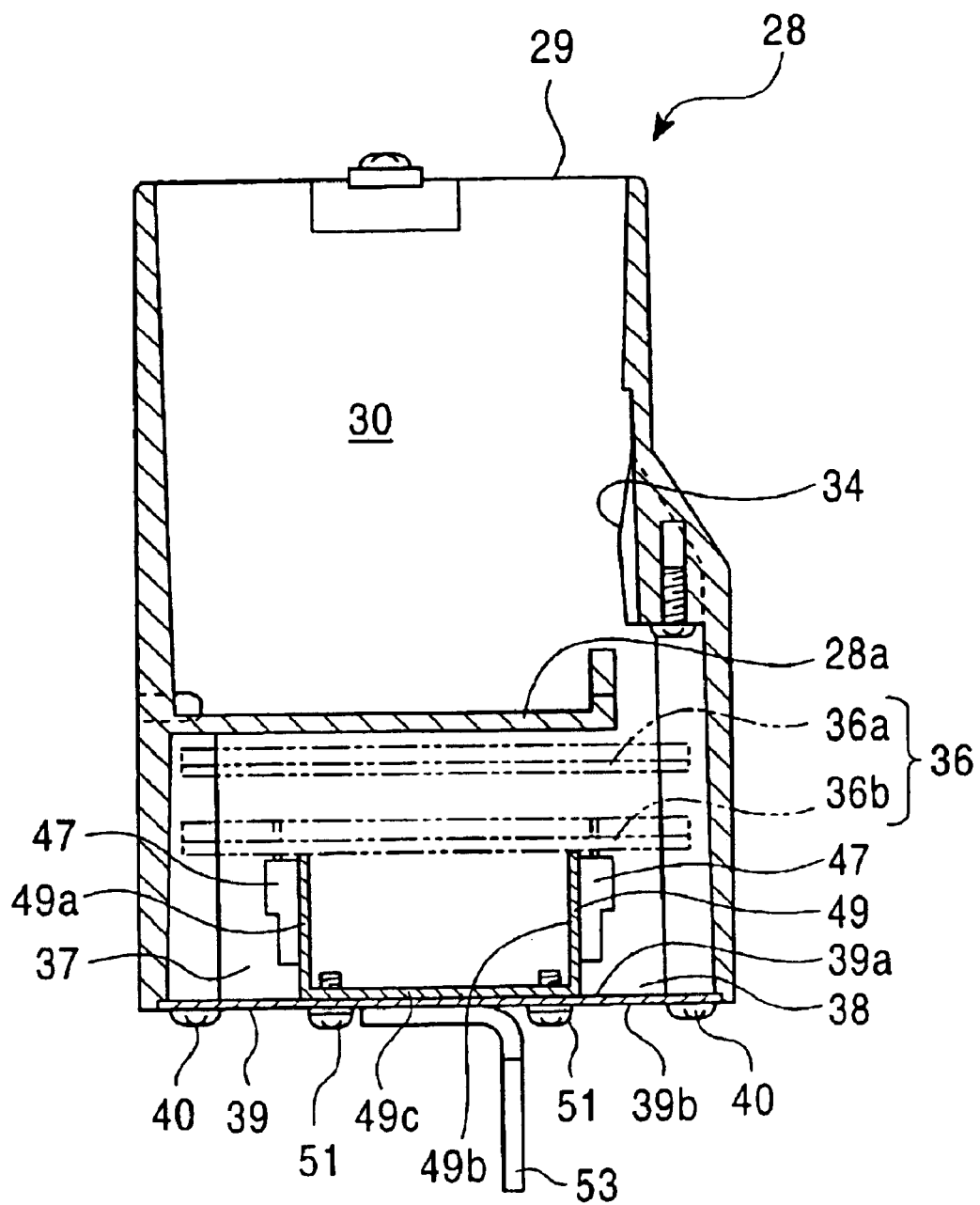
FIG. 5 is a section view taken on the line V—V shown in FIG. 1.

The battery 7 is removably set in the battery container 28. As FIGS. 4 and 5 show, the battery container 28 has an opening 29 from which the battery 7 is inserted. In this embodiment, the opening 29 is formed on the top of the battery container 28. Accordingly, to set the battery 7, the battery 7 may be inserted downward from the opening 29 into the battery container 28. After the battery 7 is inserted into the battery container 28, the battery 7 and the battery container 28 are engaged with each other by an engaging unit (not shown), so that the battery 7 is accommodated in the battery container 28. conversely, to remove the battery 7, it may be pulled upward. As described above, the battery 7 can be easily set or removed by insertion or pulling.

The battery container 28 has therein a battery accommodating portion 30 whose depth, which specifically corresponds to a length in which the battery 7 is inserted and which corresponds to the vertical length of the battery accommodating portion 30 in FIGS. 1, 4, and 5, is shorter than a length in which the battery 7 is inserted. In a state in which the battery 7 is fitted into the battery container 28, part (the top) of the battery 7 is positioned outside the battery accommodating portion 30, and another part (the bottom) of the battery 7 is positioned in the battery accommodating portion 30.

The battery 7 can be inserted or pulled by using a handle 32 (FIG. 1) on the battery 7. The handle 32 is provided on the top of the battery 7 which is positioned outside the battery accommodating portion 30 when the battery 7 is set. The handle 32 has (therein) a release-operation portion (lock releasing trigger) 33 (FIG. 1) for releasing the engagement between the battery 7 and the battery container 28. By upwardly pushing the release-operation portion 33, the engagement by the engaging unit is released. By upwardly pulling the handle 32 while gripping it and the release-operation portion 33, the engagement by the engaging unit is released, enabling the battery 7 to be pulled out. Accordingly, the battery 7 can be easily removed since a direction in which the release-operation portion 33 is operated for operation release corresponds to a direction in which the battery 7 is pulled.

The battery 7 has a lower portion (a portion of the battery 7 which is positioned in the battery accommodating portion 30 when the battery 7 is set) provided with output terminals (not shown). Inside the battery accommodating portion 30 is provided battery connecting terminals 34 (FIGS. 4 and 5) corresponding to the output terminals. When the battery 7 is set in the battery container 28, the output terminals of the battery 7 are connected to the battery connecting terminals 34.

In addition to the battery accommodating portion 30, the battery container 28 includes a circuit board container 37 for containing circuit boards 36 such as the controller. The battery container 28 is not only a container for the battery 7 but also a container for the circuit boards 36 (controller).

In the battery container 28, the battery accommodating portion 30 and the circuit board container 37 are separated by a separator 28a. The separator 28a separates the inside of the battery container 28 in the direction (vertical direction) in which the battery 7 is inserted. The part of the battery container 28 above the separator 28a is used as the battery accommodating portion 30, and the part of the battery container 28 below the separator 28a is used as the circuit board container 37. In other words, the circuit board container 37 is disposed to the battery accommodating portion 30 in the innermost (bottom of the battery container 28) of the direction in which the battery 7 is inserted. By arranging the battery accommodating portion 30 and the circuit board container 37 in parallel, the required space for arrangement is reduced. Also, the battery container 28 contains both the battery 7 and the circuit boards 36, whereby both 7 and 36 are close in position to each other, and wires connecting both 7 and 36 are shortened, thus achieving efficiency of wiring.

In the battery container 28, the circuit board container 37 also has an opening 38. The opening 38 is formed on the bottom of the battery container 28, having a downward opening shape. The battery container 28 is provided with a cover 39 so that the opening 38 is covered. The cover 39 is removably provided on the battery container 28. Specifically, the cover 39 is fixed to the battery container 28 by screws 40. The circuit boards 36 can be put from the opening 38 and can be disposed in the circuit board container 37. Thus, assembly, etc., is facilitated, even if the circuit board container 37 is positioned in the innermost of the direction in which the battery 7 is inserted.

The circuit boards 36. (controller) consist of a plurality of boards (two boards in this embodiment). A first circuit board 36a and a second circuit board 36b are arranged in parallel, opposing each other. The area required for this arrangement can be reduced compared with the case of using a single board to form a controller circuit board, etc. Since the first circuit board 36a and the second circuit board 36b are arranged in parallel in the direction (vertical direction) in which the battery 7 is inserted, their dimension in the direction (cross-direction or horizontal direction) orthogonal to the battery-inserted direction is prevented from increasing. This downsizes the battery container 28.

Figure 7:
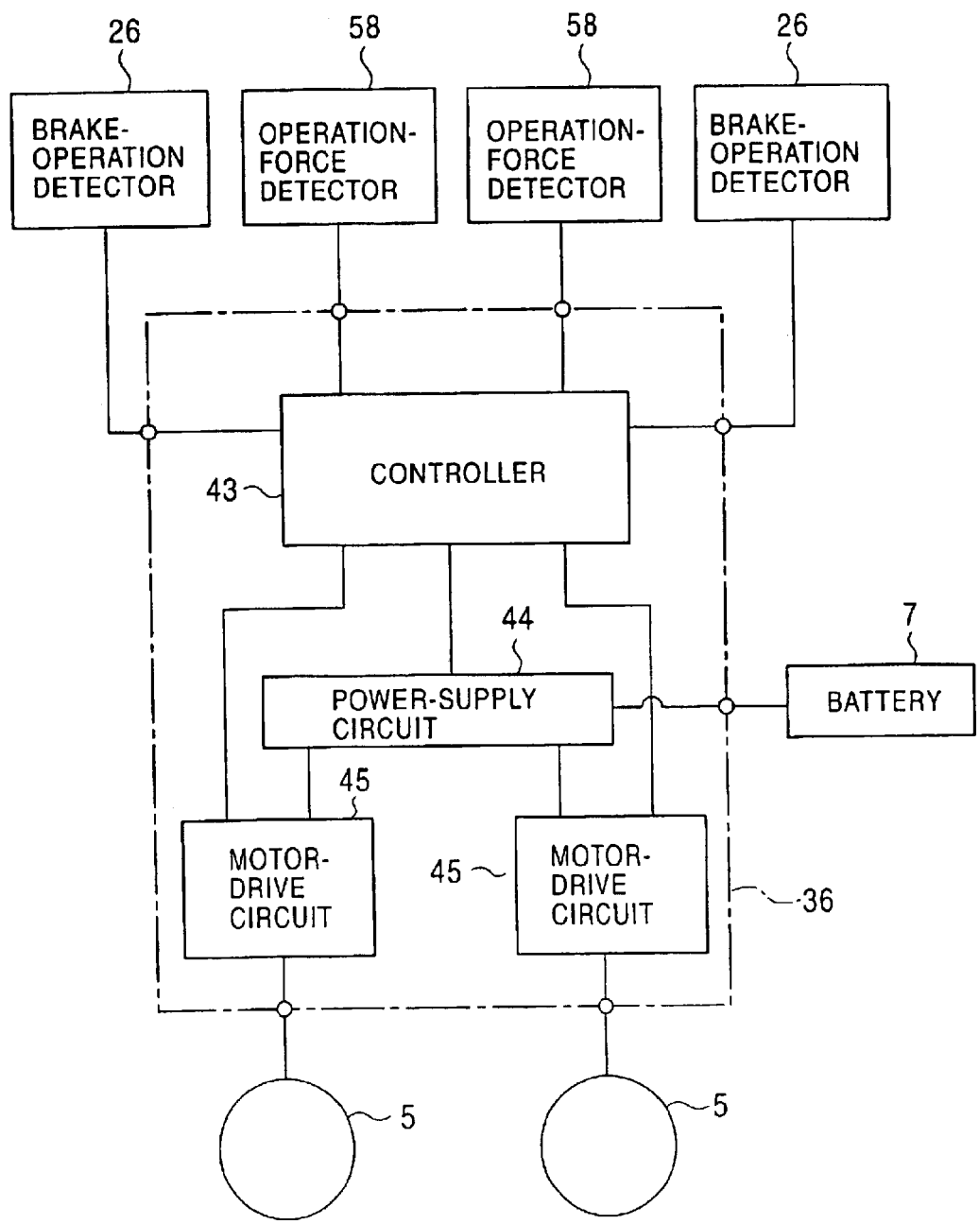
FIG. 7 is a control block diagram of the electric-powered wheelchair in FIG. 1.

Referring to FIG. 7, electronic circuits formed on the circuit boards 36a and 36b are divided broadly into a controller (control circuit) 43, a power-supply circuit 44, and a motor-drive circuit 45. Among the circuit boards 36a and 36b, the motor-drive circuit 45 is provided on the second circuit board 36b (on the bottom) closest to the cover 39. The motor-drive circuit 45 includes field effect transistors (FETS) as circuit components 47. The number of FETs 47 on the motor-drive circuit 45 is plural (twelve in this embodiment). The FETs 47 generate large amounts of heat because relatively large currents flow in the FETs 47.

The FETs 47 are mounted on the second circuit board 36b so as to be positioned between the second circuit board 36b and the cover 39. The FETs 47 are provided with component stays 49 composed of highly thermal conductive material (e.g., metal). The component stays 49 are provided on the FETs 47 so that surface contact is established, and heat generated by the FETs 47 is efficiently conducted to the component stays 49. In other words, the component stays 49 have a heat radiating function for the FETs 47. When heat-generating circuit components other than the FETs 47 are provided, they can be also provided with the component stays 49 for heat radiation.

Referring further to the FETs 47 and the component stays 49, the FETs 47 are two rows of a plurality of (six) FETs provided on the second circuit board 36b. The component stays 49 have abutting side walls 49a and 49b which are fixed to the rows of the FETs 47 so that surface contact is established, and a connecting face portion 49c which connects the side walls 49a and 49b. The side walls 49a and 49b, and the connecting face portion 49c, are formed so that a formed section is almost U-shaped as a whole.

The component stays 49 are provided in contact with the cover 39. Specifically, the component stays 49 are provided so that the connecting face portion 49c touches an inner surface 39a of the cover 39. The component stays 49 and the cover 39 can be separated. Specifically, the component stays 49 and the cover 39 are joined by screws 51. Accordingly, by unscrewing the screws 51 and the screws 40, the cover 39 can be removed from the battery container 28, with the component stays 49 mounted on the FETs 47.

The cover 39 is composed of highly thermal conductive material (e.g., metal), and is provided so as to touch the component stays 49. Thus, the heat generated by the FETs 47 as heat-generating components are conducted to the cover 39 through the component stays 49, so that heat radiation is performed from the battery container 28 to its exterior. In other words, the cover 39 also has a heat radiator function.

The cover 39 has an outer surface 39b provided with a radiator 53. The radiator 53 is L-shaped, and is provided projecting from the cover 39, with its base portion 53a brought in surface contact with the outer surface 39b of the cover 39. The radiator 53 is fixed to the cover 39 by spot-welding the base portion 53a to the cover 39.

The heat generated by the FETs 47 as heat-generating components is conducted to the radiator 53 through the component stays 49 and the cover 39, and the radiator 53 efficiently radiates the heat.

The radiator 53 is also used as a mounting stay for mounting the battery container 28 on the wheelchair body 2. Specifically, the radiator 53 as the stay has screw holes 54 for mounting the battery container 28 on the wheelchair body 2. Specifically, the radiator 53 as the stay is provided on a housing 5a for one of the electric-powered drivers 5. That is, the battery container 28 is provided on the housing 5a for either electric-powered driver 5. The battery container 28 is provided only for either one of the electric-powered drivers 5.

Figure 6:
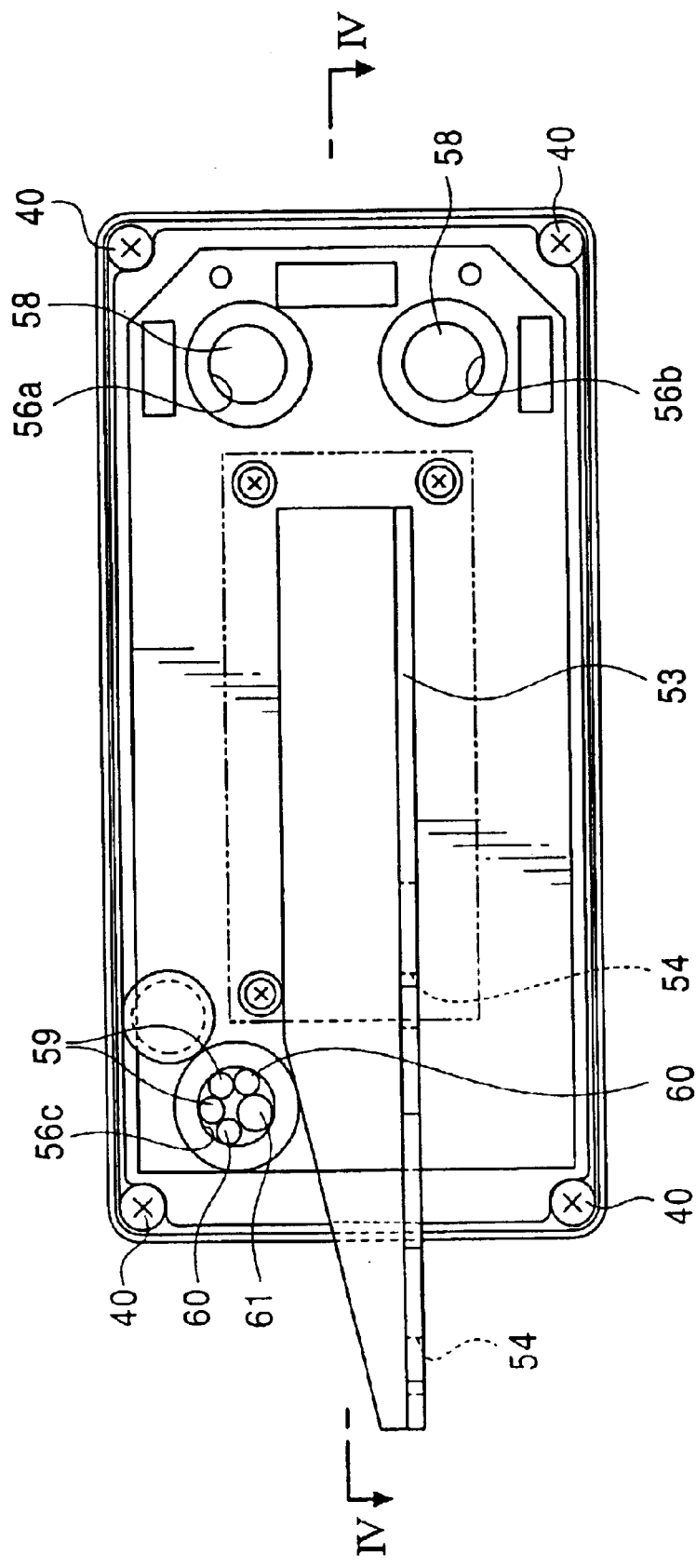
FIG. 6 is a bottom view of a battery container.

As FIG. 6 shows, the cover 39 has through-holes 56a, 56b, and 56c which are continuous from the circuit board container 37 to the exterior of the battery container 28. The through-holes 56a, 56b, and 56c are cable-inserted holes into which electric cables connected to the circuit boards 36 are inserted. Electric cables led from portions of the electric-powered wheelchair 1 pass through the through-holes 56a, 56b, and 56c, and are connected to the circuit boards 36. In FIG. 6, the through-holes 56a and 56b are used as motor-cable-inserted holes into which cables connected to the motors of the electric-powered drivers 5 are inserted, and the through hole 56c is used as a cable-inserted hole into which cables 59 connected to operation-force detectors 58, cables 60 connected to brake-operation detectors 26, and a cable connected to a power-supply-switch/battery-level-indicator unit are together inserted. The power-supply-switch/battery-level-indicator unit is provided in the vicinity of either operation grip 15.

As the block diagram in FIG. 7 shows, the operation-force detectors 58 and the brake-operation detectors 26 are connected to the controller 43. A signal representing a vehicle operating force detected by the operation-force detector 58 in either operation grip 15, and a brake-operation signal detected by either brake-operation detector 26 are input to the controller 43.

The controller 43 includes a central processing unit, a memory, and an analog-to-digital converter. In response to the input signal of the vehicle operating force, the controller 43 generates a driving-force signal for generating an assisting driving force that assists propulsive force of the electric-powered wheelchair 1. The driving-force signal is supplied to each motor-drive circuit 45, and operates its electric-powered unit 5 (motor) for generating an assisting driving force based on the driving-force signal. Control of the electric-powered unit 5 (motor) is performed by PWM control.

While the assisting driving force is being generated by pushing the electric-powered wheelchair 1 (the vehicle operation portions 14) on an upslope or the like by the caregiver, when the caregiver operates the brake levers 24 in the brake operating portions 19 for braking, the brake mechanisms 20 operate and the brake is applied. The brake operation is detected by either brake-operation detector 26, and a brake-operation signal is input to the controller 43.

Detection of the brake operation causes the controller 43 to perform control so that the assisting driving force is forcibly reduced, even if the vehicle operating force (pushing force) is applied by operating either vehicle operation portion 14. As a result, the assisting driving force is reduced regardless of the vehicle operating force. Control of the assisting driving force to be reduced is performed for both electric-powered drivers 5 on the right and left sides when either brake-operation unit 19 is operated. In other words, only by operating either brake-operation unit 19, the driving forces of both wheels 3 are reduced, so that improved operability is obtained.

According to this embodiment, an assisting driving force operating against a braking force is reduced, by eliminating or reducing the assisting driving force generated simultaneously with the braking force. In addition, an unnecessary assisting driving force generated when a brake operation is performed is reduced. The absence of the unnecessary assisting driving force only needs a small braking force, thus facilitating the brake operation.

Figure 8:
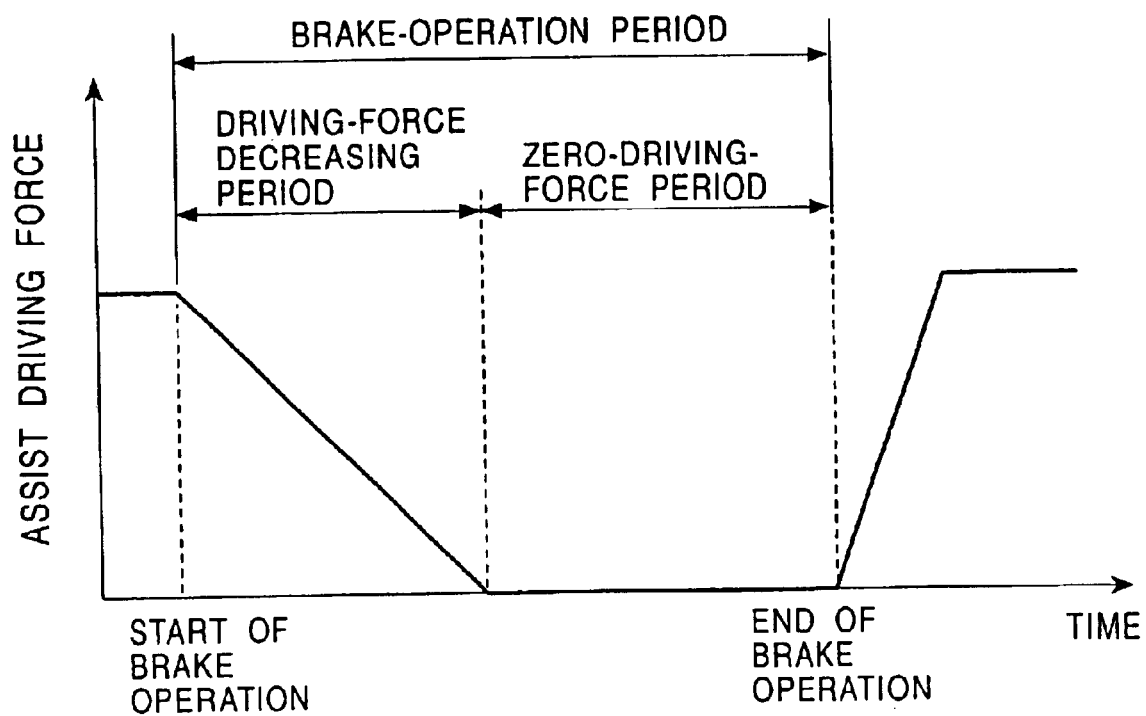
FIG. 8 is a graph showing a state in which an assisting driving force decreases.

As FIG. 8 shows, after the brake operation is detected, the assisting driving force gradually decreases and finally decreases to zero (driving-force decreasing period). A state (zero-driving-force period) in which the assisting driving force is zero continues while the brake operation is being performed, that is, the brake lever 24 is being gripped. After the assisting driving force decreases to zero, a force that moves the electric-powered wheelchair 1 against the braking force is not generated. This facilitates braking, and good brake operability can be obtained.

After the brake operation is detected, the assisting driving force is gradually reduced instead of immediately reducing the assisting driving force. Thus, if the brake operation is performed when the electric-powered wheelchair 1 is on an upslope, the weight of the electric-powered wheelchair 1 is prevented from acting on the operator at a time.

After the brake operation is deactivated, the controller 43 performs control again so that a driving force in accordance with a vehicle operating force is generated, thus enabling a normal movement.

In this embodiment, while the brake operation is being detected, the controller 43 ignores the vehicle-operating-force signal. Instead, by setting a virtual vehicle-operating-force signal (zero or a small value close to zero), the controller 43 calculates an assisting driving force. This reduces the assisting driving force. In the calculation of the assisting driving force, regardless of detection of the brake operation, the controller 43 performs arithmetic processing so that an abrupt change of the assisting driving force is prevented, or so that a rate of change of the assisting driving force is limited so as not to exceed a predetermined range. The use of the arithmetic processing enables a reduction in the assisting driving force just after the brake operation starts, and a gradual increase in the assisting driving force just after the brake operation ends, as shown in FIG. 8. Moreover, the assisting driving force can be also gradually changed, together with a gradual change in the setting of the virtual vehicle-operating-force signal.

The present invention is not limited to the above embodiment. For example, when the brake operation is detected, the driving force does not need to decrease to zero, but the driving force only needs to decrease to a level at which braking is not substantially hindered. In addition, each brake-operation detectors 26 does not need to be provided in each brake operation portion 19, but may be provided in another portion of the electric-powered wheelchair 1, such as the brake mechanism 20. The brake-operation detectors 26 are not limited to limit switches, but various sensors such as optical sensors may be employed.

What is claimed is:

1. An electric-powered vehicle supplied with a propulsive force based on a vehicle operating force applied by an operator of said electric-powered vehicle and an assisting driving force, said electric-powered vehicle comprising:

a vehicle frame;

a plurality of wheels provided to support said vehicle frame;

at least one operation-force detector for detecting the vehicle operating force applied to said vehicle by the operator via said frame;

at least one electric-powered driver for driving said wheels to supplement the vehicle operating force applied to said vehicle by the operator via said frame;

at least one manual brake-operation unit for applying manual braking forces on said wheels;

at least one brake-operation detector for detecting a manual brake operation performed by said manual brake-operation unit; and a controller for controlling said electric-powered driver, wherein said controller controls said electric-powered driver to generate the assisting driving force in accordance with the vehicle operating force detected by said operation-force detector, and controls said electric-powered driver to reduce the assisting driving force generated by the electric-powered driver in accordance with the vehicle operating force detected by said operation-force detector when the manual brake operation is detected by said brake-operation detector.

2. The electric-powered vehicle according to claim 1, wherein, when the manual brake operation is detected by said brake-operation detector, said controller gradually reduces the assisting driving force generated by said electric-powered driver.

3. The electric-powered vehicle according to claim 1, wherein, when the manual brake operation is detected by said brake-operation detector, said controller reduces the assisting driving force generated by said electric-powered driver to zero.

4. The electric-powered vehicle according to claim 1, wherein said manual brake-operation detector is provided in said brake-operation unit.

5. The electric-powered vehicle according to claim 1, wherein:

said manual brake-operation unit comprises a brake-operation-unit body and a movable portion provided on said brake-operation-unit body so as to be moved; and said brake-operation detector is provided on said brake-operation-unit body, and detects a movement of said movable portion.

* * * * *